United States Patent Office 3,222,186
Patented Dec. 7, 1965

3,222,186
PROCESS FOR SOFTENING THE SHELL PORTIONS
OF CRUSTACEANS FOR EDIBLE PURPOSES
Esler L. D'Aquin, 5959 Colbert St., Apt. 3,
New Orleans 24, La.
No Drawing. Filed Oct. 8, 1962, Ser. No. 229,229
1 Claim. (Cl. 99—111)

This invention relates to a process for in situ softening the relatively hard shell portions of common crustaceans such as crabs, crayfish, shrimp, lobsters, and the like belonging to the class Crustacea. More particularly it provides a novel and economically feasible chemical process for treating natural hard-shell crustaceans to enhance their quality and value by converting them into relatively soft-shell crustaceans without substantially altering their physical composition, size, appearance and palatability. The process provided herein is particularly applicable to the blue crab *Callinectes sapidus* Rathbun, one of the most widely consumed crustaceans that grow in size by the natural process of "molting" or "shedding." These crabs are most prevalent in the waters of the Chesapeake Bay and the Gulf Costal waters of the United States.

Practically all crustaceans are captured in the live hard-shell state. They must be cooked as explained below to render the meat palatable. The meat is then separated by hand-picking it from the exoskeleton. The blue crab, however, is an exception in that a sizable proportion of the catch is converted by a segment of the seafood industry into "soft-shell" crabs, the shells of which are soft to the touch, and "paper-shell" crabs, the shells of which are somewhat less soft. Both are well established food delicacies, and command a market price of 4 to 6 times, on an equal size basis, that obtainable for crabs in the hard-shell state. The principal reasons for this are that soft-shell crabs have a more appealing flavor, and when fried or broiled, practically the entire crab can be eaten. In contrast, to prepare hard-shell crabs for eating, they are first boiled; and after cooling, the edible meat fragments must be hand-picked from the shell cavities, which is a tedious procedure. Further, the inedible shell or skeleton portion constitutes about two-thirds or more by weight of the whole crab, and must be discarded as waste.

The methods employed by commercial fisherman for the harvesting of hard crabs, and for the production of soft crabs therefrom will not be described here, but is given in detail in Commercial Fisheries Review, Fish and Wildlife Service, U.S. Department of Interior, Washington, D.C., volume 20, No. 6, June 1958, pages 6–17. Briefly, the catch is first classified to select only those crabs which are judged by experience to be ready to shed in a period of about 1 to 15 days. These are then further segregated, and are placed in submerged wooden or wire cages in accordance with the number of days in which they are expected to shed. Different fishermen employ different procedures but in all cases, the boxes or cages containing the crabs that have reached the stage where they are nearest to shedding their hard shells are carefully examined every few hours in order to remove them from the water after they have completed shedding for it is at this point that they are most desirably soft. The above procedure is traditional and is employed throughout the world for the production of soft crabs. As far as is known, there are no other methods or techniques that have proved successful in reducing the time and labor required; and moreover, none have proved successful for producing soft crabs from hard crabs which are not "full" (fat), i.e. not ready for early shedding, and none have proved successful in producing soft crabs from paper-shell crabs.

I have discovered that hard-shell shellfish belonging to the class Crustacea can be converted into substantially soft-shell shellfish by a simple and inexpensive chemical treatment, followed by a simple soaking or washing in water to remove the excess of the treating chemicals. I have found that the process provided by this invention produces soft-shell products of acceptable appearance and edibility, and in the case of crabs, products which are comparable to those attainable by natural molting. Furthermore, I have observed that the process is equally capable of softening crabs and other types of crustaceans which have been previously boiled in water, and of thoroughly softening partially softened crabs known in the trade as "paper-shell" crabs, providing the process is carried out in close accordance with the specific steps and conditions described herein.

Commercial adoption of the subject invention would offer a number of beneficial potentialities to the seafood industry, and to the seafood consuming public. First, it would alleviate the ever-present shortage of soft crabs during the normal soft crab season, and also during the slack part of the season when the hard crab catch diminishes to the point where the production of soft crabs by the orthodox method becomes economically impractical. Second, it would force a significant reduction in the retail price of soft crabs, owing to the low overall cost of carrying out the subject process.

The following is included to illustrate the types of edible products that can be prepared from each of the most widely known types of crustaceans after they have been converted by my process from the raw hard-shell state to the soft-shell state.

(a) *Softened raw hard crabs.*—Live hard crabs can be converted into substantially softened crabs or into partially softened crabs. Either product can be cooked by frying or by broiling, as is customary for cooking natural soft or paper-shell crabs. However, an advantage of the chemically softened crabs over naturally softened crabs is that they can be more effectively seasoned by the incorporation of salt, etc. in the soaking water used for the final deacidification. The partially softened crabs may also be boiled with seasoning to yield a product, the softened state of which would facilitate hand-picking of the meat for consumption as is, or for incorporation in specialty food preparations. In addition, partially softened crabs would be more suitable than regular hard crabs for use in "gumbos" and for "stewing." They can also be shredded or comminuted in the converted state, or boiled after the conversion, for use in seafood preparations such as "crabburgers" and "stuffed crabs." Partially softened crabs either as is, or after boiling, can also suitably be frozen or hermetically canned for use as dogfood or catfood.

(b) *Softened boiled hard crabs.*—Raw hard crabs can be softened by boiling directly in the chemical solution, or they can be boiled first and then softened at lower temperatures in the chemical solution. Either product can be fried, broiled, or stewed, either as is, or after reboiling with additional seasoning. They can also be used for hand-picking of the meat, or they can be shredded or comminuted and seasoned for use in preparing food items mentioned above.

(c) *Softened paper-shell crabs.*—Paper-shell crabs can be converted into substantially soft-shell crabs. The softened crabs can be cooked by frying or broiling in the same manner as natural or market soft crabs.

(d) *Softened lobsters and crayfish.*—Raw hard-shell lobsters or crayfish can be converted to the partially softened state and after deacidification, can be boiled with seasoning as is customary with regular market lobsters and crayfish. Also, they can be boiled first and then chemically softened; or they can be softened by boiling directly in the chemical solution. An advantage of the chemically softened crustacean is easier hand-picking of the meat.

In carrying out the subject invention with a crustacean such as, for example, the hard-shell blue crab, live specimens of legal size and preferably "full" (fat), are held submerged in an excess of an aqueous solution of an organic or a mineral acid which kills them within 10 to about 30 minutes. They are then allowed to continue soaking in the solution for a prolonged and sufficient period of time until the outer and inner shells have softened to an acceptable degree as determined by the feel or touch. The soaking step is most important as it is the step which accomplishes the softening of the shells. After the crabs are softened, they are removed from the acid solution bath and are subjected to a sequence of soakings or washes in cool or heated tap water to remove substantially all of the residual entrained and absorbed acid. If desired, the last traces of residual acid can be effectively neutralized by employing a final soaking in a weak solution of a mild alkaline agent such as sodium bicarbonate. The substantially deacidified softened crustaceans are the final end products, and in this form are suitable for cooking for edible use. However, it is customary prior to cooking, to lift the ends of the large top shell with the fingers, and to remove any undigested food particles that were originally contained in the craw of the crab when caught. At the same time, the lungs and eyes may also be removed.

A number of bench-scale experiments were carried out to determine optimum processing conditions for the conversion to the soft-shell state of the following: raw hard-shell crabs; boiled (cooked) hard-shell crabs; raw paper-shell crabs; raw lobsters; raw crawfish. Acids explored were reagent grades of acetic, hydrochloric, lactic, orthophosphoric and citric acids. Ranges investigated of the other important variables were: acid concentration of the soaking or treating bath or solution, 0 to 10% by weight; bath temperature, 40 to 212 degrees Fahrenheit. Criteria employed for establishing the optimal levels or values for each of the process variables and the optimal combinations of same were: degree of shell softening; degree of retention of the original appearance and color; flavor after cooking; and the treatment time required. To reduce processing costs to a minimum, the experiments were designed to establish conditions of least severity, minimum complexity, and lowest processing expense, consistent with acceptable product quality.

In the processing by my invention of the various types of shellfish enumerated in the preceding paragraph, it has been observed that the degree of shell softening attained depends principally upon the particular acid employed, its concentration in the treating bath, the temperature of the bath, and the time duration of the treatment. Further, it has been found that the rate and degree of shell softening can be increased by increasing the concentration of acid in the treating bath; and that the rate and degree of shell softening can be increased also by increasing the temperature of the treating bath. However, it has been discovered that there exists a limit in acid concentration and also a limit in temperature of the treating bath and of the combination of the two, beyond which the shells of the crustaceans develop an objectionable mottled brownish red discoloration. The presence of even a slight amount of said discoloration very adversely affects the appearance, acceptability and salability of the softened shellfish to the ultimate consumer. Therefore, it is incumbent upon the operator of my process to employ conditions as set forth herein to insure the most satisfactory softening of the shells, without causing any discoloration of the shells.

In carrying out the subject invention for the processing of any one of the various types of crustaceans, it is pointed out that under any one set of conditions of acid concentration and temperature of the treating bath, individual crustaceans vary somewhat from one to another in the time required for the development of the same degree of shell softness as determined by tactile examination. The reasons for this, while not known, may be that some shellfish have thicker shells than others, depending possibly upon their age and size, and possibly upon the mineral composition of the water in which they lived.

As will be shown in the specific examples that follow, I prefer to soften the shells of raw crabs by soaking them in water that contains organic acid in an amount of about from 3 to 5% by weight. Concentrated acetic acid which assays about 90 to 100% by weight is the organic acid that I prefer to use. And in the softening of the shells of raw live crabs by my process, I prefer to operate my process at temperatures that do not exceed about 80 degrees Fahrenheit, because higher temperatures tend to unevenly discolor the shells of the crabs.

The following two examples are presented to illustrate in more detail the important features involved in the practice of the subject invention for the softening of raw live crabs. However, as it is obvious that numerous variations can be made in practicing the invention, the scope of the invention is defined by the claim.

EXAMPLE I

Live hard crabs of medium and large sizes were subjected to a series of separate soaking treatments in which the acid concentration and the temperature of the treating solution were varied within the limits given in Table I. The acid used was reagent grade acetic acid, assaying from 95% to 100% of acetic acid by weight. Range of acid concentration in the treating bath was 0 to 10% by weight. Bath temperatures employed were 40, 80, and 100 degrees Fahrenheit. Temperatures were thermostatically controlled.

In each experiment, the raw hard crabs were held submerged in the bath until the shells of the crabs were judged by tactile examination to be acceptably soft. At this point, the presence or absence of shell discoloration was recorded, and also the elapsed treatment time. Experiment 2 was discontinued after 35 hours, as the crabs showed little or no signs of softness, due probably to the low acid concentration employed. Experiment 1 was discontinued after 72 hours as the crabs showed little or no signs of softness, probably because of the low bath temperature employed.

The results in Table I show clearly that the best or optimum results were obtained in Experiments 3 and 4, in which was employed a combination of 80 degrees Fahrenheit bath temperature and acid concentrations of the treating bath of 3 and 5% by weight. These conditions yielded final crab products of acceptable softness, and having no discernible shell discoloration. These data show that acetic acid is definitely a suitable acid for the softening of raw hard crabs by the subject process.

The softened crabs resulting from the treatment in Experiment 4 at 80 degrees Fahrenheit with a 5% concentration of acetic acid were soaked in running tap water for 2 to 4 hours to substantially free them of residual acid. They were then dipped in a seasoning batter preparation and were deep-fried in cooking oil. The fried crabs compared favorably in palatability, flavor, etc. with fried soft and paper-shell crabs that were purchased live in the local market.

Table I

| Exper. No. | Degrees Temp. Fahren. | Acetic Acid Concentrat., Wt. Percent | Soaking Time, Hours | Properties of Softened Crabs | |
|---|---|---|---|---|---|
| | | | | Acceptable Softness | Discoloration of Shells |
| 1 | 40 | 0-8 | 72 | No | No. |
| 2 | 80 | 2 | 35 | No | No. |
| 3 | 80 | 3 | 25-35 | Yes | No. |
| 4 | 80 | 5 | 15-30 | Yes | No. |
| 5 | 80 | 6-10 | 15-10 | Yes | Yes. |
| 6 | 100 | 3 | 25 | Yes | Yes. |
| 7 | 100 | 5 | 12-22 | Yes | Yes. |

EXAMPLE II

A number of organic acids other than acetic acid were evaluated for their effectiveness and all-around suitability for the softening of raw hard crabs. For each of these acids the same pattern of experiments as employed in Example I (Table I) was repeated using the same ranges of acid concentration and temperature of the treatment bath. The acids evaluated were orthophosphoric (85%), lactic (85%), and citric (90%). The results showed that none of these acids even at the higher levels of both acid concentration and bath temperature, was capable of softening the shells of raw hard crabs to an acceptable degree, and all caused objectionable discoloration of the shells. Hence, none of the above acids would be considered suitable.

The same pattern of experiments listed in Table I was conducted using the mineral acid, concentrated hydrochloric acid (reagent grade, assaying 37% hydrogen chloride). The results showed that in each experiment, the degree of shell softening achieved was equal to that obtained using acetic acid, and that the time required was somewhat shorter in each case. However, in each of the experiments, the shells exhibited objectionable discoloration before they had become acceptably softened. Because of the latter, hydrochloric acid would not be considered a suitable acid for the production of a high-grade softened crab product.

I claim:

A process for softening the shells of raw crabs for edible purposes comprising soaking the raw crabs at a temperature not above 80 degrees Fahrenheit in an aqueous solution containing about from 3% to 5% by weight of acetic acid for a period of about from 15 hours to 35 hours.

References Cited by the Examiner

UNITED STATES PATENTS

| 2,041,727 | 5/1936 | Prytherch et al. | 99—111 |
| 2,554,625 | 5/1951 | McFee et al. | 99—188 |
| 2,669,520 | 2/1954 | Fellers | 99—195 X |

A. LOUIS MONACELL, *Primary Examiner.*

HYMAN LORD, *Examiner.*